United States Patent [19]

Schieber

[11] Patent Number: 4,539,229
[45] Date of Patent: Sep. 3, 1985

[54] METHOD OF PROVIDING A SHAPED CARBON ARTICLE

[75] Inventor: Franz Schieber, Röthenbach a.d.Pegnitz, Fed. Rep. of Germany

[73] Assignee: C. Conradty Nürnberg GmbH & Co KG, Röthenbach a.d. Pegnitz, Fed. Rep. of Germany

[21] Appl. No.: 624,010

[22] Filed: Jun. 25, 1984

[30] Foreign Application Priority Data

Jul. 1, 1983 [DE] Fed. Rep. of Germany ....... 3323800

[51] Int. Cl.$^3$ ............................................. B05D 7/00
[52] U.S. Cl. ................................... 427/215; 427/221; 427/227; 427/228; 427/379; 427/382; 427/407.1; 427/411
[58] Field of Search ............... 427/228, 379, 382, 411, 427/407.1, 212, 215, 221, 227

[56] References Cited

U.S. PATENT DOCUMENTS 3,649,196  3/1972  Degginger ........................ 427/228
3,998,689 12/1976  Kitago et al. ...................... 427/228
4,234,650 11/1980  Schieber ........................... 427/228
4,396,669  8/1983  Cariou ............................. 427/228

FOREIGN PATENT DOCUMENTS 1444461  7/1976  United Kingdom .

Primary Examiner—Michael R. Lusignan
Assistant Examiner—Janyce A. Bell
Attorney, Agent, or Firm—Parmelee, Bollinger, Bramblett & Drumm

[57] ABSTRACT

The invention relates to a method for providing a shaped carbon article of low green or crude density and high porosity, in particular for heat insulation, by means of which it is intended to produce shaped carbon articles of actually any dimensions and configurations from comparatively inexpensive organic materials, also from waste products from the paper-making industry. According to the invention, this is done in that paper particles in platelet form having an average diameter of from 0.5 to 5 mm and an average thickness of from 0.01 to 1 mm and/or in strip form having an average length of from 5 to 100 mm, an average width of from 0.5 to 10 mm and an average thickness of from 0.01 to 1 mm, which include an ash content of from 0.005 to 5%, are impregnated with a carbonaceous binder, in that the paper particles are thereupon shaped to form an article and said article is then through a corresponding temperature treatment condensed, carbonized and optionally graphitized.

4 Claims, No Drawings

METHOD OF PROVIDING A SHAPED CARBON ARTICLE

BACKGROUND OF THE INVENTION

The invention relates to a method for providing a shaped carbon article of low green density and high porosity, in particular for heat insulation.

Heat insulating materials customarily are highly porous, lightweight materials, which exhibit low heat conductivity and to a greater or lesser extent prevent heat transfer through convection. Substantially only carbon material is suited for heat insulation in the high-temperatur range, as said material is known to have low vapour pressure up to the highest temperatures and to sublime only at about 3500° C.

A method for producing a plate-configured carbon article is known, which has a green or crude density of from 0.1 to 0.8 g/cm$^3$, a thickness of from 0.1 to 5 mm and a ratio of plate area to plate thickness of at least 10$^5$, with the organic material being carbon or graphite felt, whose surfaces are covered substantially only with coked or, resp., graphitized impregnating agent (German Patent No. 2,724,131).

The production of such carbon felts involves a substantial effort, however, last but not least due to the fact that at first it is necessary to lay down the fibers or filaments, which such felts are composed of, in the form of an ideally irregular random positioning and to subsequently thereto felt and roll them in known manner, so that non wovens, i.e. fiber batts are obtained, which must thereafter be converted to carbon or, resp., graphite by being heated (German published application No. 2,305,105).

Furthermore, a method for providing a carbon paper is known, in which a mixture of carbon fibers, pulp, paper sheet binder is produced and shaped to form a sheet, which ist in a subsequent impregnation operation impregnated with high-molecular substances and heated in an inert gas so as to carbonize the organic fibers (German OS No. 2,432,706). The impregnation operation takes place by immersing the paper sheet into an impregnation or binder solution, which fully remains in the sheet and is through subsequent carbonization converted to a carbon-containing binder, which joins together the carbon fibers of the paper. This process primarily serves to stabilize to the desired extent the strength and electrical conductivity of the carbon-fiber-paper produced. Due to its relatively low porosity, however, that kind of paper is not only inadequately suited as heat insulation material but, rather, also calls for substantial effort from the standpoint of production technique on account of the fact that it consists of two starting materials, namely carbon fibers and paper material.

DESCRIPTION OF THE INVENTION

It is, therefore, an object underlying this invention to provide a method of the type as mentioned, by means of which it is possible to in a simple and low-cost manner configure carbon shaped articles, which fulfill all requirements regarding good heat insulation, especially in the hightemperature range. It is a further object to provide a method of the above mentioned type to produce carbon shaped articles which can, moreover, be adjusted such that they also are suited, in view of their specific weight and their strength, in particular for the insulation of large-surface-area, large-volume objects.

According to the invention, these and other objects are accomplished in that paper particles in platelet from having an average diameter of from 0.5 to 5 mm and an average thickness of from 0.01 to 1 mm and/or in strip form having an average length of from 5 to 100 mm, an average width of from 0.5 to 10 mm and an average thickness of from 0.01 to 1 mm, which include an ash content of from 0.005 to 5%, are impregnated with a carbonaceous binder, in that the paper particles are thereupon shaped to form an article and said article is then subjected to temperature treatments for con-densation, carbonization and optionally graphitization Consequently, a shaped carbon article of carbonized and/or graphitized paper particles in platelet form or in strip form or the like are produced according to the invention, in which regard the paper particles may also be waste products from the papermaking industry or such like, provided that the waste papers have an ash content of from 0.005 to 5% prior to carbonization.

According to an advantageous further development of the method of the invention, it is possible to at first carbonize the paper particles, after they have been impregnated with a carbonaceous binder, and to thereafter subject them to a further impregnation, before they are shaped to form an article, which then experiences the required temperature treatment for the purpose of condensation, carbonization and optionally graphitization.

The substantial concept of the invention hence is the use of carbonized paper particles of dimensions which may be selected within relatively broad limits, such as they are oftentimes also available as waste products, and which have been impregnated or coated with organic substances.

For the process product, namely the shaped carbon articles, there are possibilities of use not only as heat insulation members but, rather, also as filler members for distillation columns and ion exchangers as well as the use as absorption agent, for example for decoloration and filtration of liquids and gases.

The process of the invention will be explained in more detail by way of the following two exemplary embodiments.

EXAMPLE 1

Strips of a width of about 2 mm were produced with the aid of a shredder from low-ash filter paper having an ash content of 0.16%. The average length of the strips was about 100 mm. The strips were immersed in a 50%-methanol resin solution and were impregnated in that connection. The solvent methyl alcohol was removed by evaporation from the paper strips by allowing them to stand in air. The air-dried strips were formed to a plate-shaped article of 250×140×20 mm through slight pressure and were subjected in the mold to a condensation treatment in a drying cabinet up to 150° C. The articles then were carbonized in known manner up to 900° C. Subsequently to this treatment, they had a green density of about 0.3 g/cm$^3$ and a porosity of about 70%.

EXAMPLE 2

Paper strips as according to Example 1 were impregnated through immersion with a 50%-methanol resin solution. After evaporation of the solvent, the strips were carbonated in a carbon crucible up to 900° C. with exclusion of air. The slightly bonded, carbonized particles were comminuted through slight pressure to platelet-configured carbon particles having the approximate dimensions of 3×3×0.1 mm. This powder then was again impregnated with a 50%-methanol resin solution. After evaporation of the solvent, a tubular article having an outside diameter of 70 mm, an inside diameter of 40 mm and a height of 50 mm was formed from the slightly tacky cluster material, but it was condensed in the mold through a temperature treatment up to 150° C. Then article which by then was already solid was carbonized in customary manner at 1100° C. The thus produced shaped carbon article had a green density of 0.5 g/cm$^3$ and a porosity of approx. 60%.

What is claimed is:

1. A method for providing a shaped carbon article of low bulk density and high porosity, comprising the steps of:

providing paper particles in platelet form having an average diameter of from 0.5 to 5 mm and an average thickness of from 0.01 to 1 mm or in strip form having an average length of from 5 to 100 mm, an average width of from 0.5 to 10 mm and an average thickness of from 0.01 to 1 mm, the paper particles having an ash content of from 0.005 to 5% by weight, impregnating the paper particles with a carbon-containing binder, shaping the paper particles to form an article, and subjecting the article to temperature treatments for condensation and carbonization.

2. The method recited in claim 1, including the steps of:

first carbonizing the paper particles after impregnation and before they are shaped, and further impregnating the paper particles after the first carbonization and before thay are shaped to form an article and then subjected to the temperature treatments for condensation and further carbonization.

3. The method recited in claim 1, including the step of:

subjecting the article to a further temperature treatment for graphitization subsequent to the temperature treatments for condensation and carbonization.

4. The method recited in claim 2, including the step of:

subjecting the article to a further treatment for graphitization subsequent to the temperature treatments for condensation and further carbonization.

* * * * *